(12) United States Patent
Sung

(10) Patent No.: US 8,837,378 B2
(45) Date of Patent: Sep. 16, 2014

(54) METHOD AND APPARATUS FOR SCANNING SIGNALS OF NEIGHBORING BASE STATION IN BROADBAND WIRELESS COMMUNICATION SYSTEM

(75) Inventor: Ki-Won Sung, Seoul (KR)

(73) Assignee: Samsung Electronics Co. Ltd., Suwon-Si (KR)

( * ) Notice: Subject to any disclaimer, the term of this patent is extended or adjusted under 35 U.S.C. 154(b) by 1343 days.

(21) Appl. No.: 11/982,203

(22) Filed: Oct. 31, 2007

(65) Prior Publication Data

US 2008/0101294 A1    May 1, 2008

(30) Foreign Application Priority Data

Oct. 31, 2006   (KR) ............................. 2006-0106210

(51) Int. Cl.
*H04W 4/00* (2009.01)
*H04W 48/16* (2009.01)
*H04W 36/00* (2009.01)

(52) U.S. Cl.
CPC .......... *H04W 48/16* (2013.01); *H04W 36/0083* (2013.01)
USPC .......................... 370/329; 370/330; 370/328

(58) Field of Classification Search
USPC ................... 370/328–338, 349–352
See application file for complete search history.

(56) References Cited

U.S. PATENT DOCUMENTS

| 6,240,292 | B1* | 5/2001 | Haberman et al. ............ 455/439 |
| 2005/0202828 | A1* | 9/2005 | Pecen et al. .................. 455/453 |
| 2005/0272403 | A1* | 12/2005 | Ryu et al. ..................... 455/403 |
| 2005/0272481 | A1* | 12/2005 | Kim ............................ 455/574 |
| 2006/0084439 | A1* | 4/2006 | Joshi et al. ................... 455/436 |
| 2006/0199593 | A1* | 9/2006 | Heubel ....................... 455/452.1 |
| 2006/0251100 | A1* | 11/2006 | Kim et al. ..................... 370/432 |
| 2006/0252430 | A1* | 11/2006 | Barreto et al. ................ 455/450 |
| 2006/0276189 | A1* | 12/2006 | Kiernan et al. ............... 455/436 |
| 2007/0060048 | A1* | 3/2007 | Kang et al. .................. 455/13.1 |

FOREIGN PATENT DOCUMENTS

| KR | 1020040041378 A | 5/2004 |
| KR | 1020050024643 A | 3/2005 |
| KR | 1020060012842 A | 2/2006 |
| KR | 1020070071317 A | 7/2007 |

* cited by examiner

*Primary Examiner* — Shaq Taha

(57) ABSTRACT

An apparatus and method for scanning signals of a neighboring Base Station (BS) in a broadband wireless communication system is provided. In the broadband wireless communication system, a scanning method of a serving base station includes: receiving information on a frequency use status of a neighboring base station from an upper network entity; and after determining a recommended scan frequency by using the received information, transmitting a scanning response message including the recommended scan frequency.

17 Claims, 8 Drawing Sheets

| SYNTAX | SIZE (BITS) | NOTES |
|---|---|---|
| MOB_SCN-REQ_MESSAGE_FORMAT() { | — | — |
| MANAGEMENT MESSAGE TYPE = 54 | 8 | — |
| SCAN DURATION | 8 | UNITS ARE IN FRAMES. |
| INTERLEAVING INTERVAL | 8 | UNITS ARE FRAMES. |
| SCAN ITERATION | 8 | IN FRAMES |
| N_RECOMMENDED_BS_INDEX | 8 | NUMBER OF NEIGHBORING BS TO BE SCANNED OR ASSOCIATED, WHICH ARE INCLUDED IN MOB_NBR_ADV MESSAGE |
| IF(N_RECOMMENDED_BS_INDEX!=0){ | | |
|   CONFIGURATION CHANGE COUNT FOR MOB_NBR_ADV | 8 | CONFIGURATION CHANGE COUNT VALUE OF REFERRING MOB_NBR_ADV MESSAGE |
| } | — | — |
| FOR(J=0;J<N_RECOMMENDED_BS_INDEX;J++){ | — | — |
|   NEIGHBOR_BS_INDEX | 8 | BS INDEX CORRESPONDS TO POSITION OF BS IN MOB_NBR_ADV MESSAGE |
|   SCANNING TYPE | 3 | 0B000:SCANNING WITHOUT ASSOCIATION<br>0B001:SCANNING WITH ASSOCIATION LEVEL 0: ASSOCIATION WITHOUT COORDINATION<br>0B010:SCANNING WITH ASSOCIATION LEVEL 1: ASSOCIATION WITH COORDINATION<br>0B011:SCANNING WITH ASSOCIATION LEVEL 2: NW ASSISTED ASSOCIATION<br>0B100-0B111:RESERVED |
| } | — | — |
| N_RECOMMENDED_BS_FULL | 8 | NUMBER OF NEIGHBORING BS TO BE SCANNED OR ASSOCIATED, WHICH ARE INCLUDED IN MOB_NBR_ADV MESSAGE |
| FOR(J=0;J<N_RECOMMENDED_BS_FULL;J++){ | — | — |
|   RECOMMENDED BS ID | 48 | — |
|   SCANNING TYPE | 3 | 0B000:SCANNING WITHOUT ASSOCIATION<br>0B001:SCANNING WITH ASSOCIATION LEVEL 0: ASSOCIATION WITHOUT COORDINATION<br>0B010:SCANNING WITH ASSOCIATION LEVEL 1: ASSOCIATION WITH COORDINATION<br>0B011:SCANNING WITH ASSOCIATION LEVEL 2: NW ASSISTED ASSOCIATION<br>0B100-0B111:RESERVED |
| } | — | — |
| PADDING | VARIABLE | IF NEEDED FOR ALIGNMENT TO BYTE BOUNDARY. |
| TLV ENCODED INFORMATION | VARIABLE | — |
| } | — | — |

FIG.3
(CONVENTIONAL ART)

| SYNTAX | SIZE (BITS) | NOTES |
|---|---|---|
| MOB_SCN-RSP_MESSAGE_FORMAT() { | — | — |
| MANAGEMENT MESSAGE TYPE = 55 | 8 | — |
| SCAN DURATION | 8 | IN UNITS OF FRAMES. WHEN SCAN DURATION IS SET TO ZERO, NO SCANNING PARAMETERS ARE SPECIFIED IN THE MESSAGE. WHEN MOB_SCN-RSP IS SENT IN RESPONSE TO MOB_SCN-REQ, SETTING SCAN DURATION TO ZERO DENIES MOB_SCN-REQ. |
| REPORT MODE | 2 | 0B00: NO REPORT<br>0B01: PERIODIC REPORT<br>0B10: EVENT TRIGGERED REPORT<br>0B11: RESERVED |
| RESERVED | 6 | SHALL BE SET TO ZERO |
| REPORT PERIOD | 8 | AVAILABLE WHEN THE VALUE OF REPORT MODE IS SET TO 0B01.<br>REPORT PERIOD IN FRAMES. |
| REPORT METRIC | 8 | BITMAP INDICATING METRICS ON WHICH THE CORRESPONDING TRIGGERS ARE BASED:<br>BIT 0: BS CINR MEAN<br>BIT 1: BS RSSI MEAN<br>BIT 2: RELATIVE DELAY<br>BIT 3: BS RTD; THIS METRIC SHALL BE ONLY MEASURED ON SERVING BS/ANCHOR BS.<br>BITS 4-7: RESERVED; SHALL BE SET TO ZERO |
| IF (SCAN DURATION !=0) { | — | — |
| START FRAME | 4 | — |
| RESERVED | 1 | SHALL BE SET TO ZERO |
| INTERLEAVING INTERVAL | 8 | DURATION IN FRAMES |
| SCAN ITERATION | 8 | — |
| PADDING | 3 | SHALL BE SET TO ZERO |
| N_RECOMMENDED_BS_INDEX | 8 | NUMBER OF NEIGHBORING BS TO BE SCANNED OR ASSOCIATED, WHICH ARE INCLUDED IN MOB_NBR_ADV MESSAGE |
| IF(N_RECOMMENDED_BS_INDEX!=0){ | | |
| CONFIGURATION CHANGE COUNT FOR MOB_NBR_ADV | 8 | CONFIGURATION CHANGE COUNT VALUE OF REFERRING MOB_NBR_ADV MESSAGE |
| } | | |
| FOR(J=0;J<N_RECOMMENDED_BS_INDEX; J++){ | | |
| NEIGHBOR_BS_INDEX | 8 | BS INDEX CORRESPONDS TO POSITION OF BS IN MOB_NBR_ADV MESSAGE |

FIG.4A
(CONVENTIONAL ART)

| | | |
|---|---|---|
| SCANNING TYPE | 3 | 0B000:SCANNING WITHOUT ASSOCIATION<br>0B001:SCANNING WITH ASSOCIATION LEVEL 0: ASSOCIATION WITHOUT COORDINATION<br>0B010:SCANNING WITH ASSOCIATION LEVEL 1: ASSOCIATION WITH COORDINATION<br>0B011:SCANNING WITH ASSOCIATION LEVEL 2: NW ASSISTED ASSOCIATION<br>B100-0B111:RESERVED |
| IF (SCANNING TYPE == 0B010) OR (SCANNING TYPE ==0B011) { | — | — |
|   RENDEZVOUS TIME | 8 | UNITS ARE FRAMES |
|   CDMA CODE | 8 | FROM INITIAL RANGING CODESET |
|   TRANSMISSION_OPPORTUNITY OFFSET | 8 | UNITS ARE TRANSMISSION OPPORTUNITY |
| } | — | — |
| } | — | — |
| N_RECOMMENDED_BS_FULL | 8 | NUMBER OF NEIGHBORING BS TO BE SCANNED OR ASSOCIATED, WHICH ARE NOT INCLUDED IN MOB_NBR_ADV MESSAGE |
| FOR(J=0;J<N_RECOMMENDED_BS_FULL; J++){ | — | — |
|   RECOMMENDED BS ID | 48 | BS IDs OF BSs THAT MS SHALL SCAN |
|   SCANNING TYPE | 3 | 0B000:SCANNING WITHOUT ASSOCIATION SCANNIG<br>0B001:SCANNING WITH ASSOCIATION LEVEL 0: ASSOCIATION WITHOUT COORDINATION<br>0B010:SCANNING WITH ASSOCIATION LEVEL 1: ASSOCIATION WITH COORDINATION<br>0B011:SCANNING WITH ASSOCIATION LEVEL 2: NW ASSISTED ASSOCIATION<br>0B100-0B111:RESERVED |
|   IF (SCANNING TYPE == 0B010) OR (SCANNING TYPE ==0B011) { | — | — |
|     RENDEZVOUS TIME | 8 | UNITS ARE FRAMES |
|     CDMA CODE | 8 | FROM INITIAL RANGING CODESET |
|     TRANSMISSION_OPPORTUNITY OFFSET | 8 | UNITS ARE TRANSMISSION OPPORTUNITY |
|   } | — | — |
| } | — | — |
| PADDING | VARIABLE | — |
| } | — | — |
| TLV ENCODED INFORMATION | VARIABLE | — |
| } | — | — |

FIG.4B
(CONVENTIONAL ART)

| SYNTAX | SIZE | NOTES |
|---|---|---|
| SCAN ITERATION | 8 BITS | — |
| PADDING | — | SHALL BE SET TO ZERO. |
| N_RECOMMENDED_SCAN_FREQUENCY | 8 BITS | NUMBER OF OTHER FREQUENCIES TO BE SCANNED OF ASSOCIATED |
| FOR(J=0; J<N RECOMMENDED SCAN FREQUENCY; J++) { | — | — |
| RECOMMENDED SCAN FREQUENCY | 32 BITS | DOWNLINK CENTER FREQUENCY (KHZ) |
| } | — | — |
| N_RECOMMENDED_BS_INDEX | 8 BITS | NUMBER OF NEIGHBORING BS TO BE SCANNED OR ASSOCIATED, WHICH ARE INCLUDED IN MOB_NBR_ADV MESSAGE |

FIG.7

METHOD AND APPARATUS FOR SCANNING SIGNALS OF NEIGHBORING BASE STATION IN BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119 (a) of Korean patent application filed in the Korean Intellectual Property Office on Oct. 31, 2006 and assigned Serial No. 2006-0106210, the entire disclosure of which is hereby incorporated by reference.

TECHNICAL FIELD OF THE INVENTION

The present invention relates to a broadband wireless communication system. More particularly, the present invention relates to an apparatus and method for scanning signals of a neighboring Base Station (BS) in a broadband wireless communication system.

BACKGROUND OF THE INVENTION

In a broadband wireless communication system including a plurality of base stations, a mobile station (MS) may move towards a neighboring base station (BS) while maintaining a call state through a handover. When each base station deals with two or more frequency allocations, the mobile station performs a handover within a frequency allocation (FA) channel (hereinafter, referred to "intra-FA handover") or a handover between frequency allocation channels (hereinafter, referred to as "inter-FA handover"). The intra-FA handover and the inter-FA handover will be described below with reference to FIG. 1.

FIG. 1 illustrates a conventional intra-FA handover and inter-FA handover performed by a mobile station (MS).

Referring to FIG. 1, the mobile station, which receives a service and to which an FA2 is allocated among n FAs used by a BS1 100, performs a handover to a BS2 110 which uses n FAs. When the mobile station, which uses the FA2 allocated by the BS1 100, performs a handover by using an FA2 newly allocated by the BS2 110, it is called an intra-FA handover. When the mobile station, which uses the FA2 allocated by the BS1 100, performs a handover by using one FA newly allocated from the FAs of the BS2 other than the FA2, it is called an inter-FA handover.

When performing the intra-FA handover, a scanning operation is not additionally required because the signal strength of a neighboring BS can be recognized by receiving a preamble of the neighboring BS. However, the scanning operation is performed when the MS performs the inter-FA handover. When the inter-FA handover is performed, the MS has to release an FA currently allocated and used and then has to scan another FA of the neighboring BS. Thus, at this time, service disconnection is inevitable.

Now, a process in which BS signals are scanned by an MS in an Institute of Electrical and Electronics Engineers (IEEE) 802.16e system as an example of a broadband wireless communication system will be described with reference to FIG. 2.

FIG. 2 illustrates a process of scanning BS signals in a convention IEEE 802.16e system.

Referring to FIG. 2, a BS 210 periodically broadcasts a MOB-NBR_ADV message to a mobile station (MS) 220 in step 202. The MOB_NBR_ADV message includes information on a neighboring BS.

Examples of important parameters of the MOB_NBR_ADV message include a management message type that represents a type of message to be transmitted, a configuration change count that represents the number of times of changing configurations, N_NEIGHBORS that represents the number of neighboring BSs, Neighbor BS-ID that represents Identifiers (IDs) of the neighboring BSs, and extra neighbor information (e.g., Type-Length-Value (TLV) encoded neighbor information) that represents other information related to the neighboring BSs. Representative information included in the TLV is a physical frequency that indicates a physical channel frequency of the neighboring BSs.

In step 204, if the neighboring BS has to be subject to a scanning operation or if a target BS has to be determined for a handover operation, the MS 200 transmits a MOB_SCN_REQ message to the BS 210 and thus requests a scanning interval time. The MS 200 does not have to specify a BS_Index or a BS ID to be scanned among parameters of the MOB_SCN_REQ message. Therefore, the MS 200 may transmit only a part of the MOB_SCN_REQ message. A format of the MOB_SCN_REQ message will be described below in detail with reference to FIG. 3.

Upon receiving the MOB_SCN_REQ message, in step 206, the BS 210 determines a scanning start time of the MS 200 and transmits to the MS 200 a MOB_SCN_RSP message that informs whether to scanning is allowed or not. When the MS 200 transmits a simplified MOB_SCN-REQ message, only a part of the MOB_SCN_RSP message is transmitted by the BS 210. The BS 210 may transmit the MOB_SCN_RSP message without having to receive a request of the MS 200. In this case, a BS_Index parameter or a BS ID parameter has to be specified. A format of the MOB_SCN_RSP message will be described below in detail with reference to FIGS. 4A and 4B.

After receiving the MOB_SCN_RSP message, in step 220, the MS 200 performs scanning on the basis of all pieces of FA index information included in the MOB_NBR_ADV message received in step 202.

FIG. 3 illustrates a format of a MOB_SCN-REQ message in a conventional IEEE 802.16e system.

Referring to FIG. 3, the MOB_SCN-REQ message is transmitted to a BS so that an MS requests a scanning interval time in order to search for an available BS or to determine a target BS to be handed over.

FIGS. 4A and 4B illustrate a format of a MOB_SCN-RSP message in a conventional IEEE 802.16e system.

Referring to FIGS. 4A and 4B, the MOB_SCN-RSP message is transmitted by a BS in response to a MOB_SCN-REQ message transmitted by an MS. That is, the BS transmits to the MS the MOB_SCN-RSP message including FA information so as to allow scan-reporting to be started upon receiving a scanning request.

Conventionally, when the BS broadcasts a MOB_NBR-ADV message including a plurality of FA information pieces, the MS cannot recognize a channel state of another FA. Thus, an FA of a neighboring BS is scanned by transmitting the MOB_SNC-REQ message for all specified FAs. However, it is not effective for the MS to scan all FAs specified in the MOB_NBR-ADV message. This is because a service is disconnected in an FA scan time, and a time corresponding to 10 frames (or 50 msec) is required to scan one FA. If the MS scans 3 FAs, service disconnection occurs for 150 msec or more.

Therefore, there is a need for an apparatus and method for scanning only a specific FA by receiving FA information to be scanned by the mobile station.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention is to provide an apparatus and method for reducing the number of times of scanning signals of a base station (BS) in a broadband wireless communication system.

Another aspect of the present invention is to provide an apparatus and method for reducing a service disconnection time when a mobile station (MS) performs a scanning operation in a broadband wireless communication system.

Another aspect of the present invention is to provide an apparatus and method capable of applying a provider's policy to an operation of scanning base station signals in a broadband wireless communication system.

Another aspect of the present invention is to provide an apparatus and method for performing scanning by using frequency allocation (FA) information to be scanned by a mobile station in a broadband wireless communication system.

According to an aspect of the present invention, a scanning method of a serving base station in a broadband wireless communication system is provided. The method includes the steps of: receiving information on a frequency use status of a neighboring base station from an upper network entity; and after determining a recommended scan frequency by using the received information, transmitting a scanning response message including the recommended scan frequency.

According to another aspect of the present invention, a scanning method of a mobile station in a broadband wireless communication system is provided. The method includes the steps of: transmitting a scanning request message to a serving base station; receiving a scanning response message including a recommended scanning frequency from the serving base station; and performing scanning by referencing to the recommended scanning frequency included in the scanning response message.

According to another aspect of the present invention, a BS apparatus for performing scanning in a broadband wireless communication system is provided. The apparatus includes: a message processor for extracting neighboring base station's frequency allocation information received from an upper network entity; a frequency allocation (FA) determining unit in which a mobile station determines scanning frequency allocation information by using the neighboring base station's frequency allocation information; and a message generator for generating a scanning response message including the determined frequency allocation information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a format of a MOB_SCN-REQ message in a conventional IEEE 802.16e system;

FIGS. 4A and 4B illustrate a format of a MOB_SCN-RSP message in a conventional IEEE 802.16e system;

FIG. 7 illustrates a format of a MOB_SCN-RSP message in an IEEE 802.16e system according to an embodiment of the present invention.

DETAILED DESCRIPTION OF THE INVENTION

Figure 1:
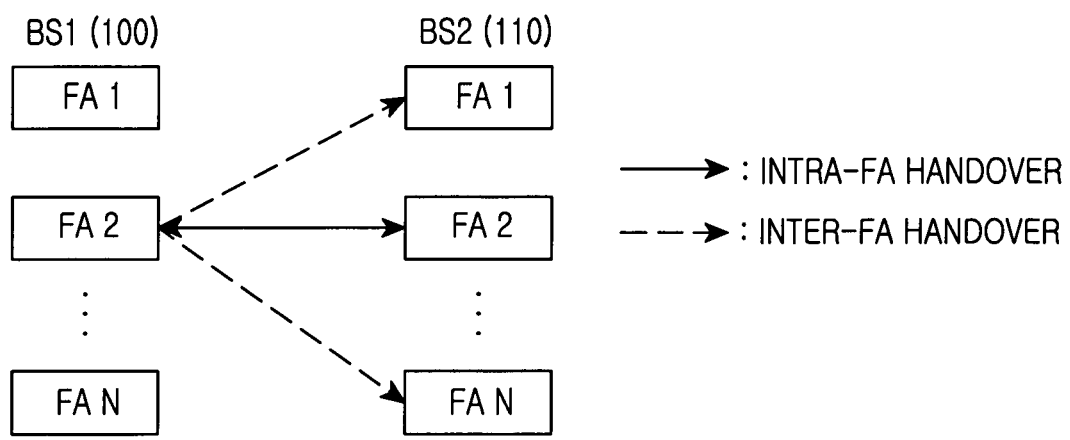
FIG. 1 illustrates a conventional intra-frequency allocation (FA) handover and inter-FA handover performed by a mobile station (MS)
Figure 2:
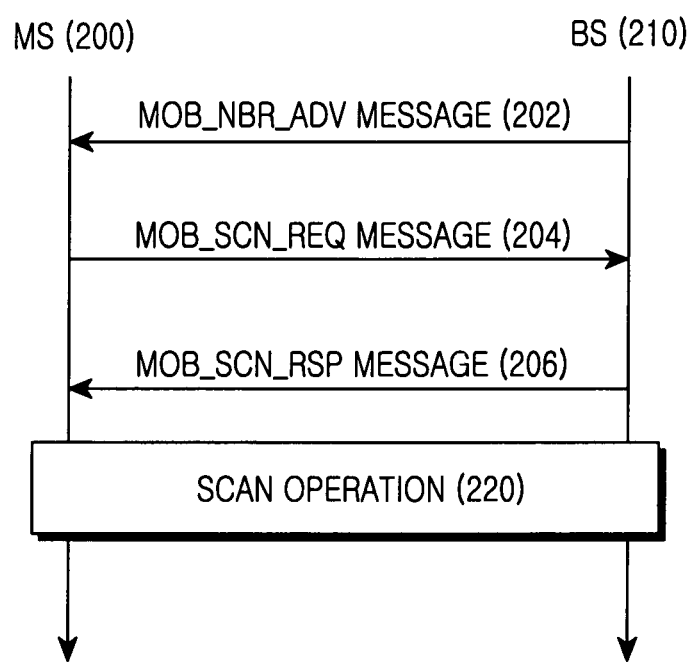
FIG. 2 illustrates a process of scanning base station (BS) signals in a convention Institute of Electrical and Electronics Engineers (IEEE) 802.16e system.
Figure 5:
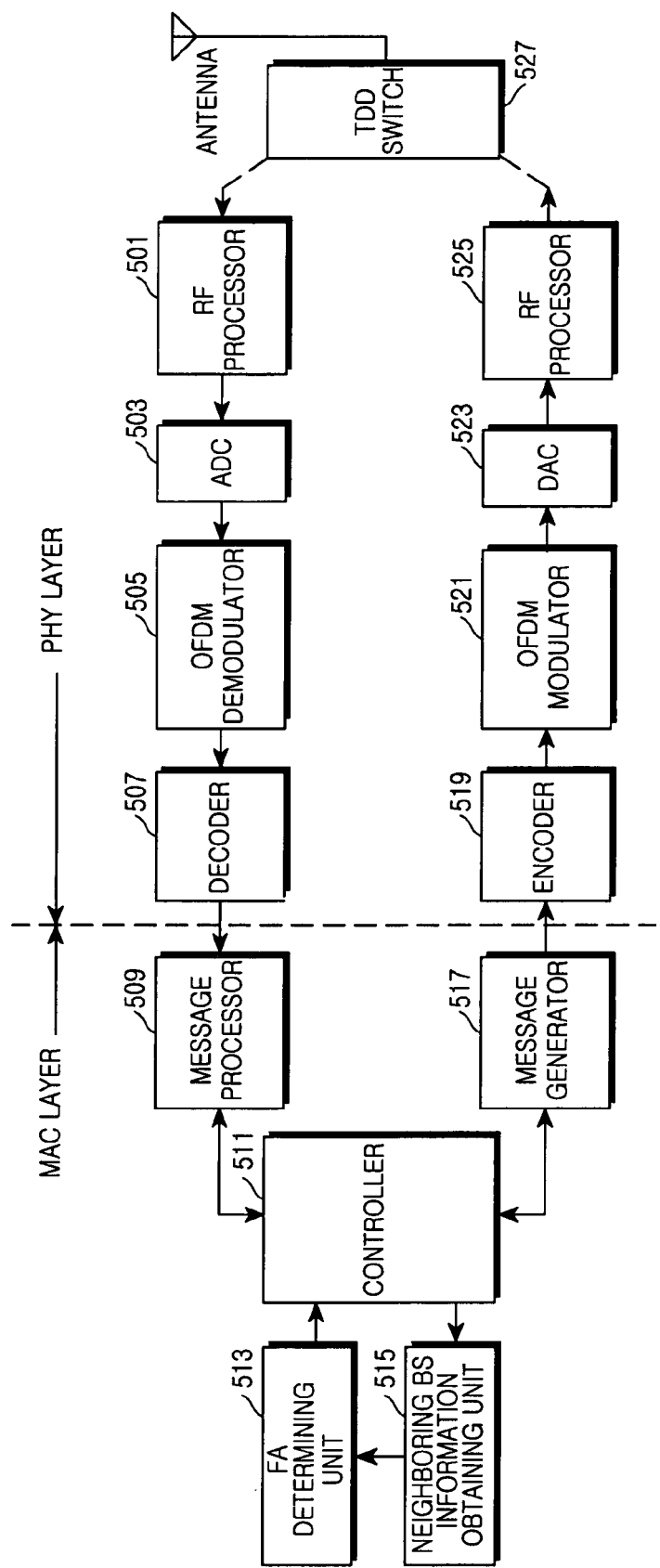
FIG. 5 illustrates a block diagram of a base station in which a message for informing FA information is sent to a mobile station, and the mobile station scans base station signals by using the message in a broadband wireless communication system according to an embodiment of the present invention.
Figure 6:
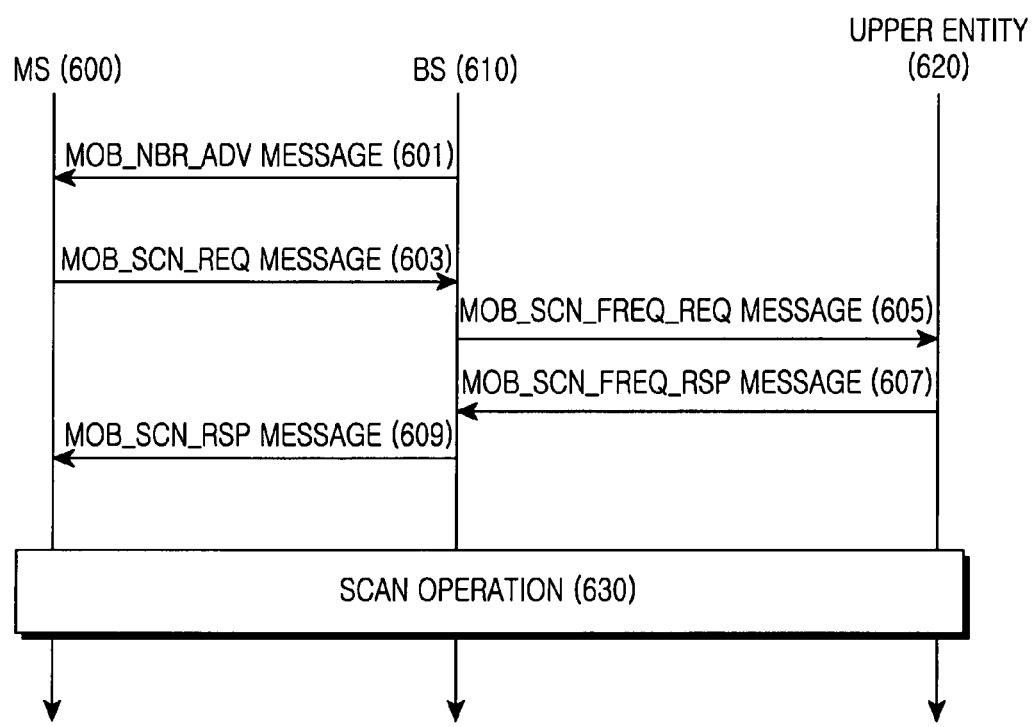
FIG. 6 illustrates a process in which a message indicating FA information is transmitted to a mobile station and then the mobile station scans base station signals by using the message in a broadband wireless communication system.

FIGS. 5 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Hereinafter, an apparatus and method of the present invention will be described in which, in a broadband wireless communication system, a base station (BS) receives frequency allocation (FA) status information of neighboring BSs from an upper entity, FA information to be scanned by a mobile station (MS) is provided to the MS, and the MS scans BS signals.

In order to realize the present invention in an Institute of Electrical and Electronics Engineers (IEEE) 802.16e system, a standard for a MOB_SCN-RSP message for informing FA information to be scanned by the MS has to be modified. Although the BS has to modify a message for providing the FA status information from the upper entity, in the present invention, it will be assumed that a MOB_SCN_FREQ_REQ message which is sent by the BS to inquire an FA status of a neighboring BS and a MOB_SCN_FREQ_RSP message which is sent to the BS to inform neighboring BS's FA information, and according to these messages, the BS is provided with FA status information.

The modification of the standard may be carried out in various manners in the implementation of the present invention. One example is shown in FIG. 7 illustrating a format of a MOB_SCN-RSP message.

FIG. 5 illustrates a block diagram of a base station (BS) in which a message for informing frequency allocation (FA) information is sent to a mobile station (MS), and the MS scans BS signals by using the message in a broadband wireless communication system according to an embodiment of the present invention.

Referring to FIG. 5, the base station (BS) includes a radio frequency (RF) processor 501, an analog/digital converter (ADC) 503, an orthogonal frequency division multiplexing (OFDM) demodulator 505, a decoder 507, a message processor 509, a controller 511, a frequency allocation (FA) determining unit 513, a neighboring BS information obtaining unit 515, a message generator 517, an encoder 519, an OFDM modulator 521, a digital/analog converter (DAC) 523, an RF processor 525, and a time division duplex (TDD) switch 527.

The TDD switch 527 controls a switching operation on the basis of frame synchronization. For example, in a signal reception period, the TDD switch 527 controls a switch so that an antenna is connected to the RF processor 501 in a receiving end. Further, in a signal transmission period, the TDD switch 527 controls the switch so that the antenna is connected to the RF processor 525 in a transmitting end.

In the signal reception period, the RF processor 501 converts an RF signal received through the antenna into a baseband analog signal. The ADC 503 converts the analog signal received from the RF processor 501 into sample data. The OFDM demodulator 505 performs a Fast Fourier Transform (FFT) operation on the sample data output from the ADC 503 and thus outputs frequency-domain data.

The decoder 507 selects data of sub-carriers to be received from the frequency-domain data received from the OFDM demodulator 505, and performs demodulation and decoding on the selected data according to a predetermined modulation level (i.e., Modulation and Coding Scheme (MCS) level).

The message processor 509 decomposes a control message input from the decoder 507 and provides the decomposition result to the controller 500. For example, information is extracted from a neighboring BS's FA information message (i.e., MOB_SCN_FREQ_RSP) received from an upper entity and a scanning interval time request message (i.e., MOB_SCN_REQ) received from the MS, and the extracted information is provided to the controller 511.

The controller 511 performs a necessary process on information received from the message processor 509, and provides the result to the message generator 517. According to the present invention, under the control of the controller 511, the neighboring BS information obtaining unit 515 obtains neighboring BS's FA status information required for a scanning operation, and provides the obtained information to the FA determining unit 513.

The FA determining unit 513 determines an FA to be scanned by the MS under the control of the controller 511. For example, preferably, the MS does not scan a specific FA in the following cases: when the intra-FA handover has a priority and the inter-FA handover is used for the purpose of load balancing; when a specific FA is dedicated to be used only for Multicast & Broadcast Service (MBS) or a MBS service is frequently used; when a traffic load of a specific FA0020 is currently significantly high in a neighboring cell; and when a specific FA cannot be used according to a network operation. Thus, in these cases, the MS determines that the FA does not perform scanning.

The message generator 517 generates a message by using various information pieces received from the controller 511 and provides the generated message to the encoder 519. For example, an FA information message (i.e., MOB_SCN_RSP) to be scanned by the MS is generated, and a message (i.e., MOB_SCN_RSP) inquiring neighboring BS's FA status information is generated.

The MOB_SCN_RSP message of the present invention is different from the conventional MOB_SCN-RSP message in that a Recommended_Scan_Frequency field is further included so as to indicate FA information to be scanned by the MS.

The encoder 519 selects data of sub-carriers to be received from the frequency-domain data received from the OFDM modulator 521 and performs demodulation and decoding on the selected data according to a predetermined modulation level (i.e., MCS level).

The OFDM modulator 521 performs an FFT operation on sample data output from the ADC 523 and thus outputs frequency-domain data.

In the aforementioned structure, the controller 511 serves as a protocol controller and thus controls the message processor 509, the message generator 517, the FA determining unit 513, and the neighboring BS information obtaining unit 515. That is, the controller 511 may perform functions of the message processor 509, the message generator 517, the FA determining unit 513, and the neighboring BS information obtaining unit 515. Although these elements are separately configured in the present invention, this is for description purpose only. Thus, in practice, all or some of these elements may be controlled by the controller 500.

FIG. 6 illustrates a process in which a message indicating frequency allocation (FA) information is transmitted to a mobile station and then the mobile station scans base station signals by using the message in a broadband wireless communication system.

Referring to FIG. 6, base station (BS) 610 periodically broadcasts a MOB_NBR_ADV message to mobile station (MS) 600 in step 601. The MOB_NBR_ADV message includes information on a neighboring BS.

In step 603, the MS 600 searches for an available BS. In addition, in order to determine a BS suitable for handover, the MS 600 requests a scanning interval time by transmitting a MOB_SCN_REQ message to the BS 610.

Upon receiving the MOB_SCN_REQ message for requesting the scanning interval time from the MS 600, the BS 610 transmits to an upper entity 620 a MOB_SCB_FREQ_REQ message for inquiring neighboring BS's FA status information in step 605. The upper entity 620 generates a MOB_SCN_FREQ_RSP message including the neighboring BS's FA status information and transmits the generated message to the BS 610 in step 607.

The MOB_SCN_FREQ_RSP message may be transmitted to the upper entity 620 whenever a scanning frequency of the MS is requested, or may be periodically transmitted to the upper entity 620 in consideration of a network load.

Upon receiving the MOB_SCB_FREQ_REQ message, the BS 620 transmits to the MS 600 a MOB_SCN_REQ message including information for determining whether the MS has to perform scanning and for determining a scan start time in step 609.

Upon receiving the MOB_SCN_REQ message, the MS 600 performs scanning on a corresponding FA at the scanning start time in step 630.

FIG. 7 illustrates a format of a MOB_SCN-RSP message in an IEEE 802.16e system according to an embodiment of the present invention.

Referring to FIG. 7, a scanning operation is performed such that a Recommended_Scan_Frequency field 700 for informing FA frequency information to be scanned by an MS is added to the conventional MOB_SCN-RSP message. That is, the Recommended_Scan_Frequency field required in the present invention is added between a scan iteration field and a Recommended_BS_Index field included in the conventional MOB_SCN_RSP message. The Recommended_Scan_Frequency field indicates a downlink center frequency. In addition, this field is expressed in the unit of kHz and can be transmitted in the same format as a frequency field included in a Downlink Channel Descriptor (DCD) (see 6.3.2.3.49 clause of the IEEE 802.16e standard and 11.4.1 clause of the IEEE 802.16d standard).

Although the present invention has been described for the IEEE 802.16e system, the present invention may also apply to another mobile communication system.

According to the present invention, a service disconnection time caused by a scanning operation can be decreased when a BS determines an FA channel to be scanned by an MS, thereby reducing an unnecessary scanning operation in a broadband wireless network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A scanning method of a serving base station in a broadband wireless communication system, the method comprising:
   transmitting, by the serving base station, a MOB_SCN_FREQ_REQ message to inquire about a frequency use status of a neighboring base station having a plurality of downlink frequencies to an upper network entity;
   receiving, by the serving base station, a MOB_SCN_FREQ_RSP message comprising information on the frequency use status of the neighboring base station from the upper network entity;
   determining, by the serving base station, at least one recommended scan frequency among the plurality of downlink frequencies based on the frequency use status of the neighboring base station; and
   in response to receiving a MOB_SCN_REQ message from a mobile station, transmitting, by the serving base station to the mobile station, a MOB_SCN_RSP message that includes the at least one recommended scan frequency determined based on the frequency use status to the mobile station.

2. The method of claim 1, wherein the MOB_SCN_RSP message includes at least one piece of recommended scanning frequency information as long as the neighboring base station does not refuse a scanning request of the mobile station.

3. The method of claim 1, wherein the recommended scan frequency indicates a downlink center frequency.

4. A scanning method of a mobile station in a broadband wireless communication system, the method comprising:
   transmitting a MOB_SCN_REQ message to a serving base station;
   receiving a MOB_SCN_RSP message that includes at least one recommended scanning frequency from the serving base station, wherein the at least one recommended scanning frequency among a plurality of downlink frequencies is determined based on a frequency use status of a neighboring base station having the plurality of downlink frequencies, the frequency use status received by the serving base station in a MOB_SCN_FREQ_RSP message from an upper network entity in response to a MOB_SCN_FREQ_REQ message; and
   performing scanning by referencing to the at least one recommended scanning frequency included in the MOB_SCN_RSP message.

5. The method of claim 4, wherein the MOB_SCN_RSP message includes at least one piece of recommended scanning frequency information as long as a neighboring base station does not refuse a scanning request.

6. The method of claim 4, wherein the recommended scanning frequency indicates a downlink center frequency.

7. A base station apparatus for performing scanning in a broadband wireless communication system, the apparatus comprising:
   a message processor configured to extract information on a frequency use status of a neighboring base station having a plurality of downlink frequencies from a MOB_SCN_FREQ_RSP message received from an upper network entity;
   a frequency allocation determining unit configured to determine at least one recommended scan frequency among the plurality of downlink frequencies based on the frequency use status of the neighboring base station;
   a message generator configured to generate a MOB_SCN_RSP message that includes the at least one recommended scan frequency determined based on the frequency use status, in response to receiving a MOB_SCN_REQ message from a mobile station; and
   a controller configured to transmit to the upper network entity a MOB_SCN_FREQ_REQ message that inquires the frequency use status of the neighboring base station.

8. The apparatus of claim 7, wherein the MOB_SCN_RSP message includes at least one piece of recommended scanning frequency information as long as the neighboring base station does not refuse a scanning request of the mobile station.

9. The apparatus of claim 7, wherein the frequency allocation information indicates a downlink center frequency.

10. A broadband wireless network comprising a plurality of base stations, each of the plurality of base stations operable to scan in the broadband wireless network, wherein each base station of the plurality of base stations comprises:
    a message processor configured to extract information on each frequency use status of a plurality of neighboring base stations having a plurality of downlink frequencies from a MOB_SCN_FREQ_RSP message received from an upper network entity;
    a frequency allocation determining unit configured to determine at least one recommended scan frequency among the plurality of downlink frequencies based on the frequency use statuses of the neighboring base stations;
    a message generator configured to generate a MOB_SCN_RSP message that includes the at least one recommended scan frequency determined based on the frequency use statuses, in response to receiving a scanning request message from a mobile station, and wherein the generated MOB_SCN_RSP message is transmitted to the mobile station; and
    a controller configured to transmit to the upper network entity a MOB_SCN_FREQ_REQ message that inquires the frequency use statuses of the neighboring base station.

11. The broadband wireless network of claim 10, wherein the MOB_SCN_RSP message includes at least one piece of recommended scanning frequency information as long as the neighboring base station does not refuse a scanning request of the mobile station.

12. A mobile station apparatus for performing scanning in a broadband wireless communication system, the apparatus comprising:
a transmitter configured to transmit a MOB_SCN_REQ message to a serving base station;
a receiver configured to receive a MOB_SCN_RSP message that includes at least one recommended scanning frequency from the serving base station, wherein the at least one recommended scanning frequency among a plurality of downlink frequencies is determined based on a frequency use status of a neighboring base station having the plurality of downlink frequencies, the frequency use status received by the serving base station in a MOB_SCN_FREQ_RSP message from an upper network entity in response to a MOB_SCN_FREQ_REQ message; and
a controller configured to perform scanning by referencing to the at least one recommended scanning frequency included in the MOB_SCN_RSP message.

13. The apparatus of claim 12, wherein the MOB_SCN_RSP message includes at least one piece of recommended scanning frequency information as long as a neighboring base station does not refuse a scanning request.

14. The method of claim 1, wherein the at least one recommended scan frequency is determined taking into consideration that a Mobile Station (MS) does not scan a specific frequency assignment (FA) in the following cases: when the intra-FA handover has a priority and the inter-FA handover is used for the purpose of load balancing; when a specific FA is dedicated to be used only for Multicast & Broadcast Service (MBS) or a MBS service is frequently used; when a traffic load of a specific FA is currently significantly high in a neighboring cell; and when a specific FA cannot be used according to a network operation.

15. The apparatus of claim 7, wherein the a frequency allocation determining unit determines the at least one recommended scan frequency taking into consideration that a Mobile Station (MS) does not scan a specific frequency assignment (FA) in the following cases: when the intra-FA handover has a priority and the inter-FA handover is used for the purpose of load balancing; when a specific FA is dedicated to be used only for Multicast & Broadcast Service (MBS) or a MBS service is frequently used; when a traffic load of a specific FA is currently significantly high in a neighboring cell; and when a specific FA cannot be used according to a network operation.

16. The method of claim 1, wherein the MOB_SCN_RSP message comprises at least one Recommended_Scan_Frequency field storing the at least one recommended scan frequency.

17. The method of claim 1, the information on the frequency use status includes at least one each traffic load of the plurality of downlink frequencies.

* * * * *